US011500556B1

(12) United States Patent
Golan et al.

(10) Patent No.: US 11,500,556 B1
(45) Date of Patent: Nov. 15, 2022

(54) STORAGE SYSTEM WITH PASSIVE WITNESS NODE

(71) Applicant: EMC IP Holding Company LLC, Hopkinton, MA (US)

(72) Inventors: Sally Golan, Tel Aviv (IL); Liran Loya, Hod Hasharon (IL); Yuval Harduf, Yehud (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 50 days.

(21) Appl. No.: 17/238,615

(22) Filed: Apr. 23, 2021

(51) Int. Cl.
*G06F 12/00* (2006.01)
*G06F 3/06* (2006.01)

(52) U.S. Cl.
CPC ............ *G06F 3/0629* (2013.01); *G06F 3/067* (2013.01); *G06F 3/0655* (2013.01)

(58) Field of Classification Search
CPC ....... G06F 3/0629; G06F 3/0655; G06F 3/067
See application file for complete search history.

(56) References Cited

U.S. PATENT DOCUMENTS

| 2011/0179188 A1* | 7/2011 | Nakagawa | G06F 3/0635 709/240 |
| 2015/0134929 A1* | 5/2015 | Anderson | G06F 12/0646 711/170 |
| 2016/0342337 A1* | 11/2016 | Gao | G06F 3/0689 |
| 2017/0315724 A1* | 11/2017 | Colgrove | G06F 3/061 |
| 2018/0293017 A1* | 10/2018 | Curley | G06F 3/0604 |
| 2020/0034043 A1* | 1/2020 | Szczepanik | G06F 11/2033 |
| 2020/0042481 A1* | 2/2020 | Lieber | G06F 13/1668 |
| 2020/0250126 A1* | 8/2020 | Guo | G06F 11/142 |
| 2020/0293551 A1* | 9/2020 | Chen | G06F 3/061 |
| 2021/0042051 A1* | 2/2021 | Ito | G06F 3/0659 |
| 2022/0147269 A1* | 5/2022 | Feng | G06F 3/0688 |

* cited by examiner

*Primary Examiner* — Shawn X Gu
*Assistant Examiner* — Mohammad S Hasan
(74) *Attorney, Agent, or Firm* — Daly, Crowley, Mofford & Durkee, LLP

(57) ABSTRACT

A method for use in a first storage array, comprising: detecting whether a second storage array has designated the first storage array as a locally-preferred storage array, the detecting being performed when a first link between the second storage array and a witness node is down; setting a value of a first configuration setting to indicate that the first storage array is designated as a system-preferred storage array, the value of the first configuration setting being stored in a memory of the first storage array, the value of the first configuration setting being set only when the second storage array has designated the first storage array as a locally-preferred storage array; detecting, by the first storage array; and when the second link is down, assuming one of an active role or a passive role based, at least in part, on the value of the first configuration setting.

20 Claims, 11 Drawing Sheets

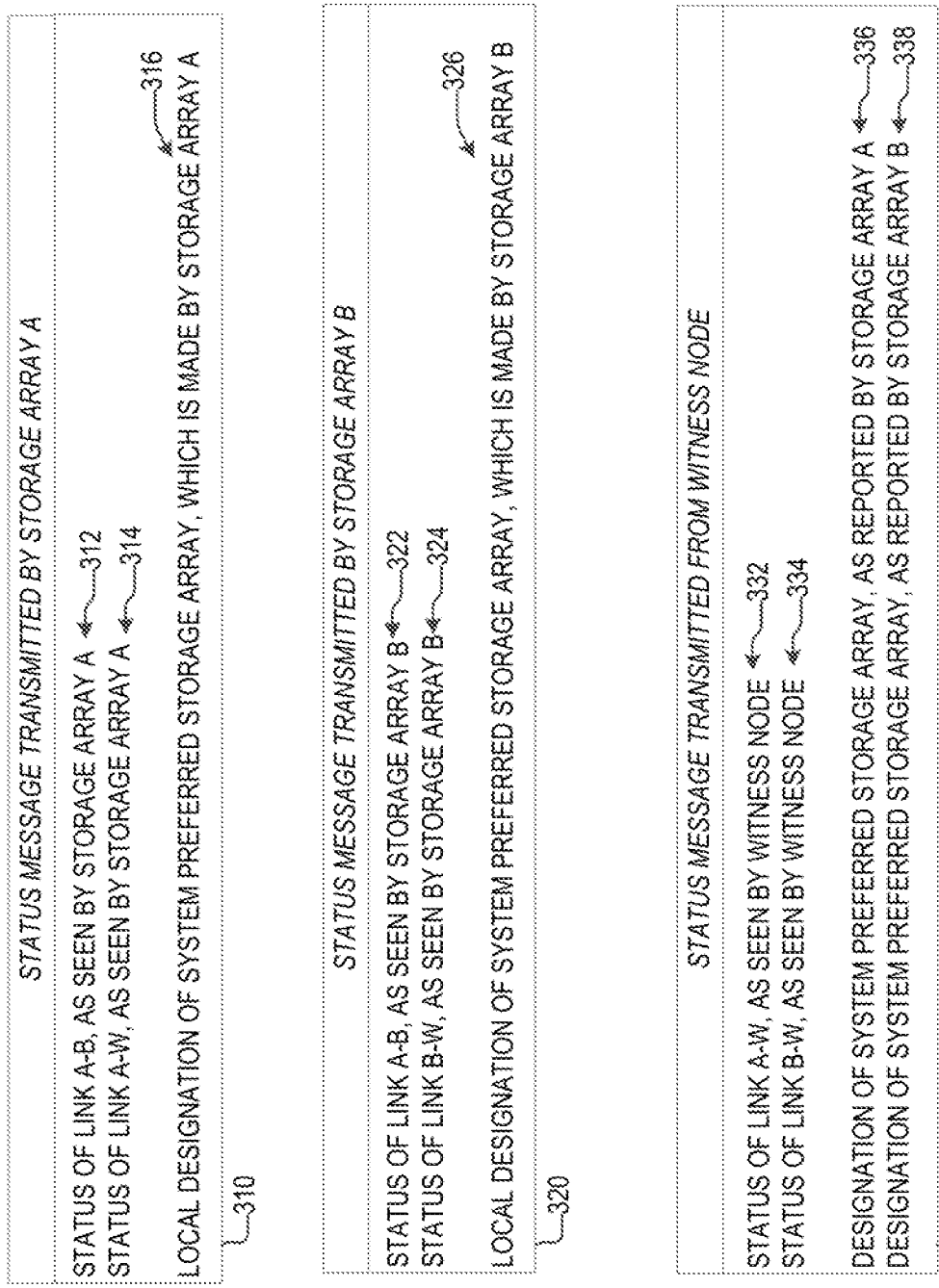

| 108A | LINK A-B | LINK A-W | LINK B-W |
|---|---|---|---|
| LINK STATE | ARRAY A REPORTS OVER LINK A-B: LINK A-B IS UP<br><br>ARRAY B REPORTS OVER LINK A-B: LINK A-B IS UP | ARRAY A REPORTS OVER LINK A-W: LINK A-W IS UP<br><br>WITNESS REPORTS OVER LINK A-W: LINK A-W IS UP | ARRAY B REPORTS OVER LINK B-W: LINK B-W IS UP<br><br>WITNESS REPORTS OVER LINK A-W: LINK B-W IS UP |
| SYSTEM-PREFERRED | ARRAY A REPORTS OVER LINK A-B: NONE IS DESIGNATED BY ARRAY A AS SYSTEM PREFERRED STORAGE ARRAY<br><br>ARRAY B REPORTS OVER LINK A-B: NONE IS DESIGNATED BY ARRAY B AS SYSTEM-PREFFERED STORAGE ARRAY | ARRAY A REPORTS OVER LINK A-W: NONE IS DESIGNATED BY ARRAY A AS SYSTEM-PREFERRED STORAGE ARRAY<br><br>WITNESS REPORTS OVER LINK A-W: NONE IS DESIGNATED BY ARRAY B AS SYSTEM-PREFERRED STORAGE ARRAY | |

FIG. 4A

| 108A | LINK A-B | LINK A-W | LINK B-W |
|---|---|---|---|
| LINK STATE | ARRAY A REPORTS OVER LINK A-B: LINK A-B IS UP<br><br>ARRAY B REPORTS OVER LINK A-B: LINK A-B IS UP | ARRAY A REPORTS OVER LINK A-W: LINK A-W IS UP<br><br>WITNESS REPORTS OVER LINK A-W: LINK A-B IS UP | ARRAY B REPORTS OVER LINK A-B: LINK B-W IS DOWN<br><br>WITNESS REPORTS OVER LINK A-W: LINK B-W IS DOWN |
| SYSTEM-PREFERRED | ARRAY A REPORTS OVER LINK A-B: ARRAY A IS DESIGNATED BY ARRAY A AS SYSTEM-PREFERRED STORAGE ARRAY<br><br>ARRAY B REPORTS OVER LINK A-B: ARRAY A IS DESIGNATED BY ARRAY B AS SYSTEM-PREFFERED STORAGE ARRAY | ARRAY A REPORTS OVER LINK A-W: ARRAY A IS DESIGNATED BY ARRAY A AS SYSTEM-PREFERRED STORAGE ARRAY<br><br>WITNESS REPORTS OVER LINK A-W: ARRAY A IS DESIGNATED BY ARRAY B AS SYSTEM-PREFERED STORAGE ARRAY | |

FIG. 4B

| 108A | LINK A-B | LINK A-W | LINK B-W |
|---|---|---|---|
| LINK STATE | ARRAY A REPORTS OVER LINK A-B: LINK A-B IS UP<br><br>ARRAY B REPORTS OVER LINK A-B: LINK A-B IS UP | ARRAY A REPORTS OVER LINK A-W: LINK A-W IS UP<br><br>WITNESS REPORTS OVER LINK A-W: LINK A-B IS UP | ARRAY B REPORTS OVER LINK B-W: LINK B-W IS DOWN<br><br>WITNESS REPORTS OVER LINK A-W: LINK B-W IS DOWN |
| SYSTEM-PREFERRED | ARRAY A REPORTS OVER LINK A-B: NONE IS DESIGNATED BY ARRAY A AS SYSTEM PREFERRED STORAGE ARRAY<br><br>ARRAY B REPORTS OVER LINK A-B: ARRAY A IS DESIGNATED BY ARRAY B AS SYSTEM-PREFERRED STORAGE ARRAY | ARRAY A REPORTS OVER LINK A-W: NONE IS DESIGNATED BY ARRAY A AS SYSTEM PREFERRED STORAGE ARRAY<br><br>WITNESS REPORTS OVER LINK A-W: ARRAY A IS DESIGNATED BY ARRAY B AS SYSTEM-PREFERRED STORAGE ARRAY | |

STORAGE SYSTEM WITH PASSIVE WITNESS NODE

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

According to aspects of the disclosure, a method is provided for use in a first storage array, comprising: detecting whether a second storage array has designated the first storage array as a locally-preferred storage array, the detecting being performed when a first link between the second storage array and a witness node is down; setting a value of a first configuration setting to indicate that the first storage array is designated as a system-preferred storage array, the value of the first configuration setting being stored in a memory of the first storage array, the value of the first configuration setting being set only when the second storage array has designated the first storage array as a locally-preferred storage array; detecting, by the first storage array, whether a second link between the first storage array and the second storage array is down; and when the second link is down, assuming one of an active role or a passive role based, at least in part, on the value of the first configuration setting.

According to aspects of the disclosure, a storage array is provided, comprising: a memory configured to store a first configuration setting and a second configuration setting; and at least one processor operatively coupled to the memory, the at least one processor being configured to perform the operations of: detecting whether a peer storage array has designated the storage array as a locally-preferred storage array, the detecting being performed when a first link between the peer storage array and a witness node is down; setting a value of the first configuration setting to indicate that the storage array is designated as a system-preferred storage array, the value of the first configuration setting being stored in a memory of the storage array, the value of the first configuration setting being set only when the peer storage array has designated the storage array as a locally-preferred storage array; detecting, by the storage array, whether a second link between the storage array and the peer storage array is down; and when the second link is down, assuming one of an active role or a passive role based, at least in part, on the value of the first configuration setting.

According to aspects of the disclosure, a non-transitory computer-readable medium is provided that stores one or more processor-executable instructions, which, when executed by at least one processor of a first storage array, cause the at least one processor to perform the operations of: detecting whether a second storage array has designated the first storage array as a locally-preferred storage array, the detecting being performed when a first link between the second storage array and a witness node is down; setting a value of a first configuration setting to indicate that the first storage array is designated as a system-preferred storage array, the value of the first configuration setting being stored in a memory of the first storage array, the value of the first configuration setting being set only when the second storage array has designated the first storage array as a locally-preferred storage array; detecting, by the first storage array, whether a second link between the first storage array and the second storage array is down; and when the second link is down, assuming one of an active role or a passive role based, at least in part, on the value of the first configuration setting.

BRIEF DESCRIPTION OF THE DRAWINGS

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 3 is a diagram illustrating examples of status messages, according to aspects of the disclosure;

FIG. 4A is a diagram of an example of a state table, according to aspects of the disclosure;

FIG. 4B is a diagram of an example of a state table, according to aspects of the disclosure;

FIG. 4C is a diagram of an example of a state table, according to aspects of the disclosure;

DETAILED DESCRIPTION

Figure 1:
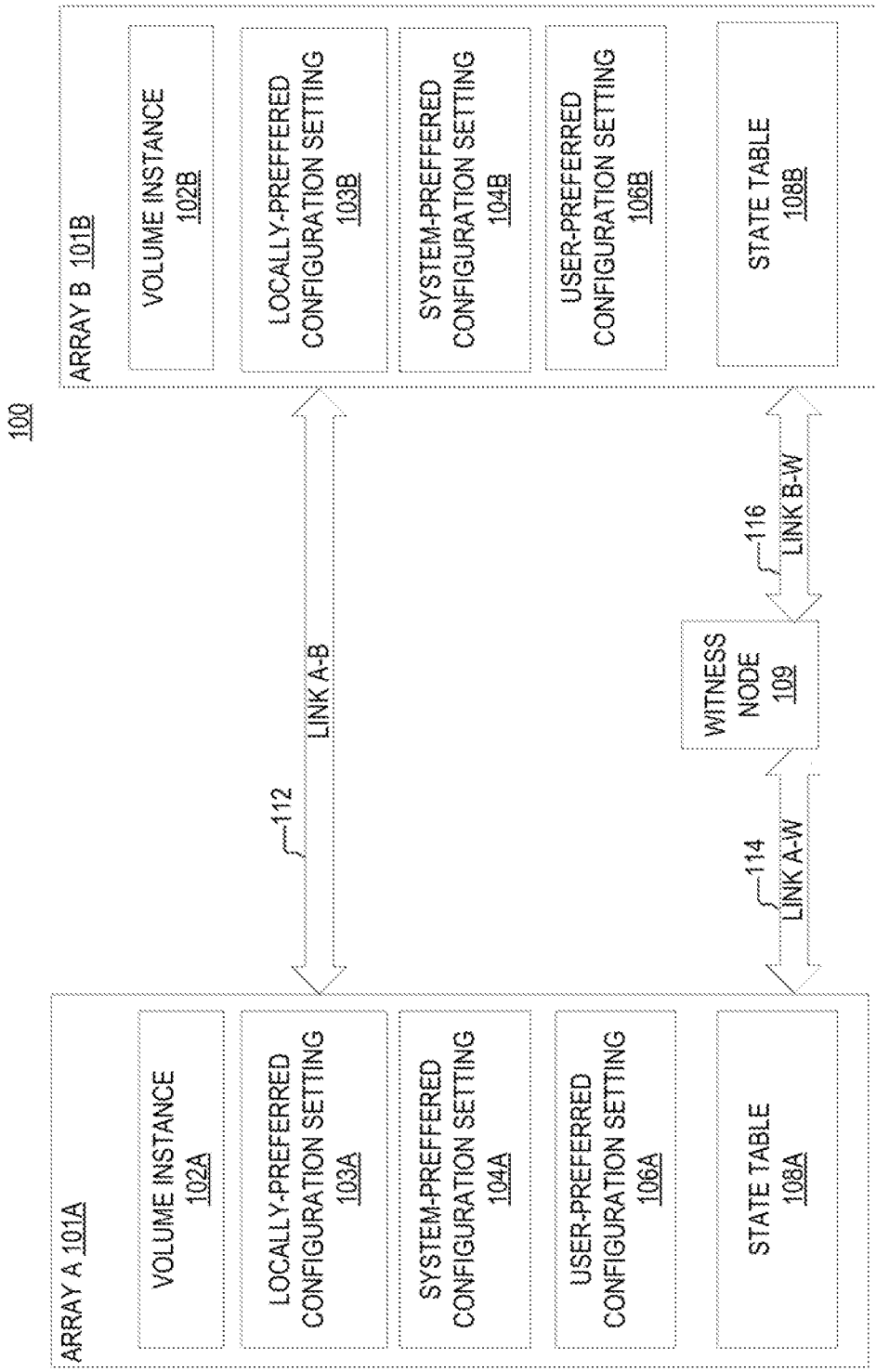
FIG. 1 is a diagram of an example of a storage system, according to aspects of the disclosure.

FIG. 1 is a diagram of an example of a storage system 100, according to aspects of the disclosure. As illustrated, the storage system 100 may include a storage array 101A, a storage array 101B, and a witness node 109.

The storage array 101A may be configured to maintain a volume instance 102A. The storage array 101B may be configured to maintain a volume instance 102B. Volume instances 102A and 102B are instances of the same volume. Both of the storage arrays 101A and 101B may be configured to service write requests to the volume, when they are active. For example, to service a write request, storage array 101A may store data associated with the write request in volume instance 102A, and then transmit the data over link 112 to storage array 101B, after which the transmitted data is stored in volume instance 102B. In other words, when the state of volume instance 102A is changed (e.g., by storing or deleting data), this change is propagated to volume instance 102B, over link 112, in order to keep volume instances 102A and 102B consistent with one another. Similarly, to service a write request, storage array 101B may store data associated with the write request in volume instance 102B, and then transmit the data over link 112 to storage array 101A, after which the transmitted data is stored in volume instance 102A. In other words, when the state of volume instance 102B is changed (e.g., by storing or deleting data), this change is propagated to volume instance 102A, over link 112, in order to keep volume instances 102A and 102B consistent with one another.

Maintaining a consistent state between volume instances is important for the operation of the storage system 100. If volume instances 102A and 102B are not consistent with one another, this could lead to client devices receiving erroneous data. The maintenance of a consistent state is performed over link 112. When link 112 is down, volume instances 102A and 102B can no longer be synchronized with one another, and they are prevented from maintaining a consistent state. Accordingly, when the link 112 is down, one of the storage arrays 101A-B may assume a passive role (and stop serving IO requests), and the other one of the storage arrays 101A-B may assume an active role (and continue serving IO requests).

The examples that follow illustrate a technique that enables the storage arrays 101A-B to choose their respective roles when link 112 fails. Specifically, the technique allows one of storage arrays 101A-B to choose a passive role and the other to choose an active role. When the technique is used, it guarantees (e.g., at least under most circumstances) that only one of storage arrays 101A-B will choose an active role and only one of the storage arrays 101A-B will choose a passive role, thereby preventing a situation in which both storage arrays have chosen the same role. Moreover, the technique allows each of storage arrays 101A-B to chose its respective role autonomously of the other.

Assuming an active role by storage array 101A may include one or more of: (i) continuing to service IO requests, (ii) transitioning into a state in which data that is written to volume instance 102A is not synchronously transmitted to storage array 101B, or (iii) maintaining a record of deletions performed on volume instance 102A, so that those deletions can be synchronized into volume instance 102B at a later time, (iv) marking data that is written to volume instance 102A (after the storage array 101A has assumed an active role), so that the data can be synchronized (e.g., copied) into volume instance 102B at a later time. Assuming an active role by storage array 101B may include one or more of: (i) continuing to service IO requests, (ii) transitioning into a state in which data that is written to volume instance 102B a is not synchronously transmitted to storage array 101A, or (iii) maintaining a record of deletions performed on volume instance 102B, so that those deletions can be synchronized into volume instance 102A at a later time, (iv) marking data that is written to volume instance 102B (after the storage array 101B has assumed an active role), so that the data can be synchronized (e.g., copied) into volume instance 102B at a later time. Assuming a passive role may include stopping to service incoming IO requests. In some implementations, when a storage array assumes a passive role, it may also transmit a message to a multipath client, or a host device, indicating that the storage array is not currently serving IO requests. By way of example, an IO request may include a read request, a write request, a delete request, etc. When storage arrays 101A-B are serving IO requests, they are both "active." However, under the nomenclature of the present disclosure, the phrase "assuming an active role" refers to the situation in which one of storage arrays 101A-B continues to service IO requests, while believing that the other storage array is unavailable and/or not serving IO requests.

Figure 9:
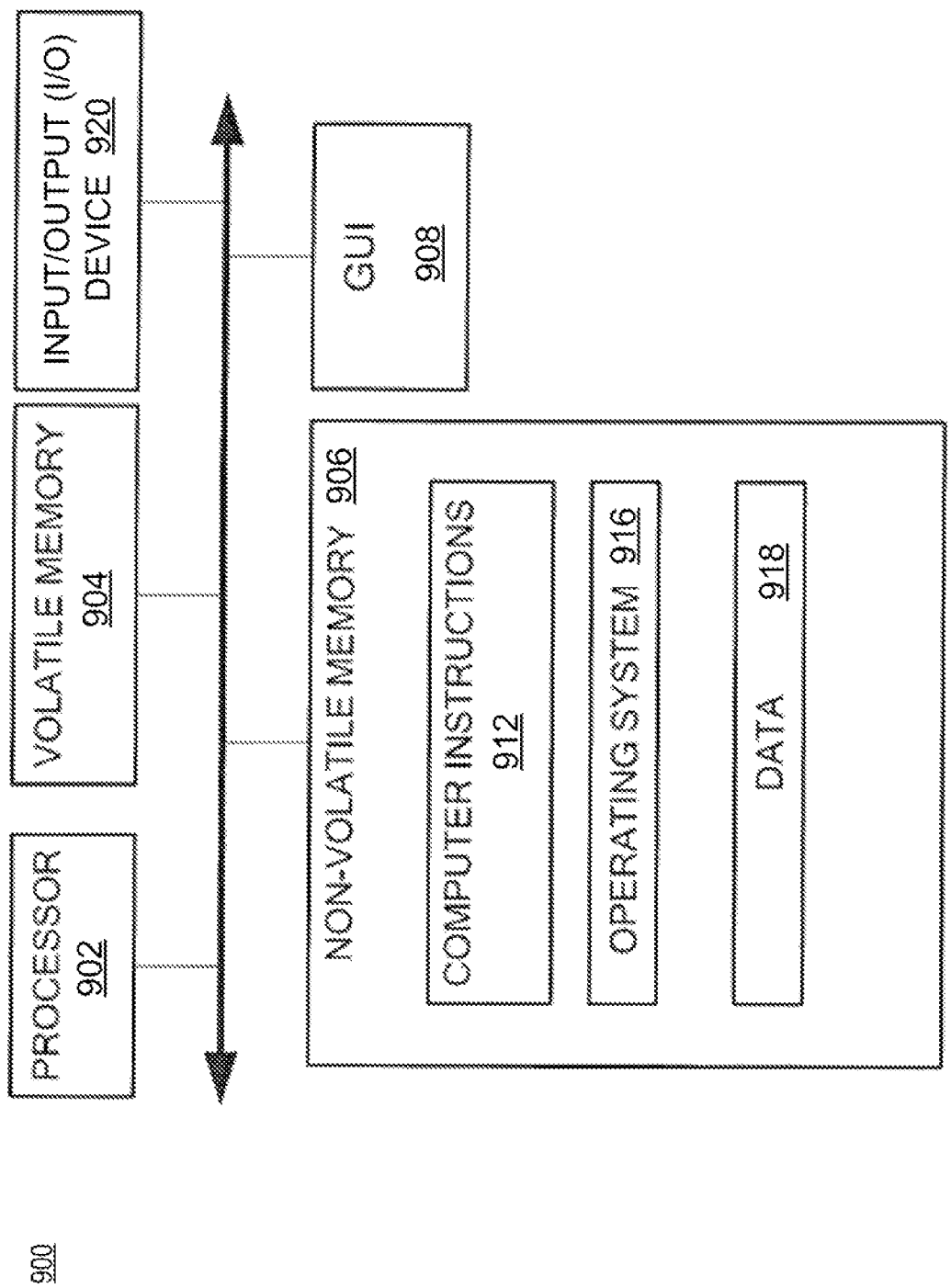
FIG. 9 is a diagram of an example of a computing device, according to aspects of the disclosure.

The storage array 101A may include one or more computing devices, such as the computing device 900, which is shown in FIG. 9. In its memory (e.g., volatile and/or non-volatile memory), the storage array 101A may store a locally-preferred configuration setting 103A, a system-preferred configuration setting 104A, a user-preferred configuration setting 106A, and a state table 108A. The storage array 101B may include one or more computing devices, such as the computing device 900, which is shown in FIG. 9. In its memory (e.g., volatile and/or non-volatile memory), the storage array 101B may store a locally-preferred configuration setting 103B, a system-preferred configuration setting 104B, a user-preferred configuration setting 106B, and a state table 108B.

Each of the user-preferred configuration settings 106A-B includes a configuration setting that specifies which one of storage arrays 101A and 101B will assume an active role in the event of a failure of link 112. The user-preferred configuration settings 106A-B are specified by the user (e.g., a system administrator), whereas the system-preferred configuration settings 104A-B are determined dynamically by the storage system 100. Moreover, the user-preferred configuration settings 106A-B are stored in the memory of storage arrays 101A-B before run-time, whereas the value of system-preferred configuration settings 104A-B is determined at runtime.

Each of system-preferred configuration settings 104A-B may be determined at run-time by the storage system 100. Each of the system-preferred configuration settings 104A-B specifies which storage array in the storage system 100 will assume an active role when link 112A fails. Each of system-preferred configuration settings 104A-B may have a value that is selected from the set {NONE, ARRAY_A, ARRAY_B}. The value of "NONE" indicates that neither storage array 101A nor storage array 101B is designated to assume an active role in the event of a failure of link 112. The value "ARRAY_A" indicates that storage array 101A is designated to assume an active role in the event of a failure of link 112 (i.e., it indicates that storage array 101A is designated as a system-preferred storage array). The value "ARRAY_B" indicates that storage array 101B is designated to assume an active role in the event of a failure of link 112 (i.e., it indicates that storage array 101B is designated as a system-preferred storage array).

As noted above, the system-preferred configuration setting 104A is stored in the memory of storage array 101A, and it is isolated from storage array 101B. Similarly, the system-preferred configuration setting 104B is stored in the memory of storage array 101B, and it is isolated from storage array 101A. When the storage system 100 is first started, system-preferred configuration settings 104A-B are initially set to NONE, and they are subsequently updated to identify one of the storage arrays 101A-B as the storage array that would assume an active role in the event of a failure of the link 112. The value of system-preferred configuration setting 104A is updated by storage array 101A independently of storage array 101B, when storage array 101A is able to confirm that the values of locally-preferred configuration settings 103A-B are in agreement with one another. In one example, updating the value of system-preferred configuration setting 104A includes causing the system-preferred configuration setting 104A to equal the value of locally-preferred configuration setting 103A. The value of system-preferred configuration setting 104B is updated by storage array 101B independently of storage array 101A, when storage array 101B is able to confirm that the values of locally-preferred configuration settings 103A-B are in agreement with one another. In one example, updating the value of system-preferred configuration setting 104B includes causing the system-preferred configuration setting 104B to equal the value of locally-preferred configuration setting 103B.

Locally-preferred configuration setting of 103A may be determined locally by storage array 101A, and it may specify which one of storage arrays 101A and 101B is preferred to assume an active role in the event of a failure of link 112. Locally-preferred configuration setting 103B may include a value that is determined locally by storage array 101B, and it may specify which one of storage arrays 101A and 101B is preferred to assume an active role in the event of a failure of link 112. As is discussed further below, each of locally-preferred configuration settings 103A-B represents an intermediate (or preliminary) value, which is used in a protocol for setting the values of system-preferred configuration setting 104A and/or system-preferred configuration setting 104B.

The witness node 109A may include one or more computing devices, such as the computing device 900, which is discussed further below with respect to FIG. 9. The witness node 109A may be connected to storage array 101A via link 114. The witness node 109A may be connected to storage array 101B via link 116. The witness node 109 may relay to storage array 101A information that is transmitted (in status messages 320) to the witness node 109 by storage array 101B. The information may include the value of the locally-preferred configuration setting 103B. The witness node 109 may further relay to storage array 101B information that is transmitted (in status messages 310) to the witness node 109 by storage array 101A. The information may include the value of the locally-preferred configuration setting 103A.

According to the present disclosure, the term "link" may refer to one or more communications channels between two entities (e.g., storage array 101A, storage array 101B, and witness node 109, etc.). A link may be UP when an entity is able to transmit information over the link and subsequently receive an acknowledgment that the transmittal has been received at its destination. A link may be DOWN when an entity is able to transmit information over the link and subsequently receive an acknowledgment that the information has been received at its destination. For example, from the perspective of storage array 101A, link 112 may be down when one or more communications networks that are used to establish the link are not operating correctly or when storage array 101B is unavailable. For example, from the perspective of storage array 101B, link 112 may be down when one or more communications networks that are used to establish the link are not operating correctly or when storage array 101A is unavailable. From the perspective of storage array 101A, link 114 may be DOWN, when one or more communications networks that are used to establish link 114 are not operating correctly or the witness node 109 is unavailable. From the perspective of the witness node 109, link 114 may be DOWN, when one or more communications networks that are used to establish link 114 are not operating correctly or when storage array 101A is unavailable. From the perspective of storage array 101B, link 116 may be DOWN, when one or more communications networks that are used to establish link 116 are not operating correctly or the witness node 109 is unavailable. From the perspective of the witness node 109, link 116 may be DOWN, when one or more communications networks that are used to establish link 116 are not operating correctly or when storage array 101B is unavailable. According to the present disclosure, in some implementations, any of the links 112, 114, and 116 may be implemented by using one or more communications networks, such as the Internet, a local area network (LAN), a wide area network (WAN), an InfiniBand network, etc. It will be understood that the present disclosure is not limited to any specific implementation of any of links 112, 114, and 116 and/or any specific method for determining when a link is UP or DOWN. Under the nomenclature of the present disclosure, when a link is DOWN, the link is considered to have failed, irrespective of whether the link being DOWN is caused by a malfunction in one or more communications networks that are used to establish the link or a malfunction in one of the entities that are connected by the link (e.g., one of storage arrays 101A-B and witness node 109).

Figure 2:
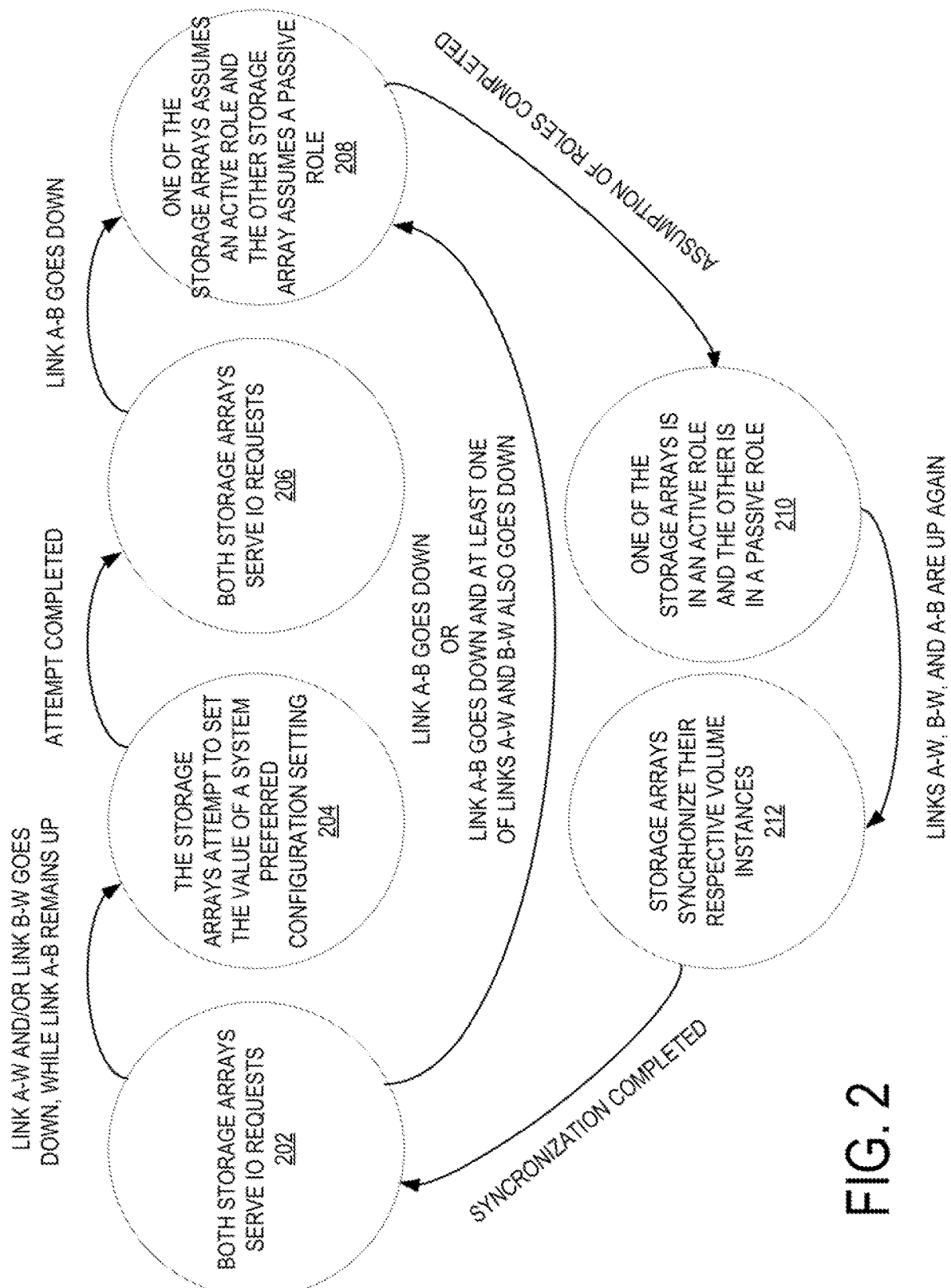
FIG. 2 is a state diagram illustrating the operation of the storage system of FIG. 1, according to aspects of the disclosure.

FIG. 2 is a state diagram illustrating aspects of the operation of the storage system 100, according to one example. When the storage system 100 is in a state 202, links 112, 114, and 116 are UP, and both storage arrays 101A and 101B are serving IO requests. The storage system 100 may transition into state 204 when at least one of links 114 and/or 116 goes DOWN. When the storage system 100 is in state 204, storage arrays 101A and 101B may attempt to set the values of system-preferred configuration settings 104A-B, respectively. When the storage system 100 is in state 204, at least one of storage arrays 101A-B may execute a process 700 (shown in FIG. 7). The storage system 100 may transition from state 204 into state 206 when the attempt is completed. When the storage system 100 is in state 206, at least one of links 114 and 116 is DOWN, link 112 is UP, and both of storage arrays 101A and 101B are serving IO requests. The storage system 100 may transition from state 206 to a state 208 when link 112 goes DOWN. When the storage system 100 is in state 208, one of the storage arrays 101A-B assumes an active role and the other one of storage arrays 101A-B assumes a passive role. Each of the storage arrays 101A-B determines its role independently of the other. When the storage system 100 is in state 208, each (or at least one) of storage arrays 101A-B may execute a process 800 (shown in FIG. 8) to assume its role. The storage system 100 may transition from state 208 to state 210 after one of storage arrays 101A-B has assumed an active role and the other one has assumed a passive role. When the storage system 100 is in state 210, one of storage arrays 101A-B may operate in an active role (i.e., it may be serving IO requests) and the other one may be in a passive role (i.e., it may not be serving IO requests). The storage system 100 may transition from state 210 to a state 212 when all of links 112, 114, and 116 are UP again. When the storage system 100 is in state 212, volume instance 102A and volume instance 102B are synchronized with each other and brought into a consistent state. After the volume instances 102A and 102B are brought into a consistent state, the storage system 100 returns to state 202.

In some implementations, the storage system 100 may transition from state 202 to state 208, when link 112 goes DOWN (and each of links 114 and 116 remains UP) or when link 112 goes DOWN (and at least one of links 114 and 116 goes DOWN). For example, if links 112 and 114 go down at the same time, storage array 101A may automatically assume a passive role, and storage array 101B may assume an active role. As another example, if links 112 and 116 go DOWN at the same time, storage array 101B may assume a passive role, and storage array 101A may assume an active role.

FIG. 3 is a diagram illustrating examples of status messages that are transmitted by storage array 101A, storage array 101B, and the witness node 109.

Message 310 is an example of a status message that is transmitted by storage array 101A to storage array 101B and the witness node 109. As illustrated, status message 310 may include fields 312, 314, and 316. Field 312 may identify the status of link 112. Specifically, field 312 may indicate whether link 112 appears to be UP or DOWN to the storage array 101A. Field 314 may identify the status of link 114. Specifically, field 312 may indicate whether link 114 appears to be UP or DOWN to the storage array 101A. Field 316 may identify the value of the locally-preferred configuration setting 103A (shown in FIG. 1). Although not shown, status message 310 may be timestamped, and it may also include the timestamp of the last valid status message 320 that is received at storage array 101A.

Message 320 is an example of a status message that is transmitted by storage array 101B to storage array 101A and the witness node 109. As illustrated, status message 320 may include fields 322, 324, and 326. Field 322 may identify the status of link 112. Specifically, field 322 may indicate whether link 112 appears to be UP or DOWN to the storage array 101B. Field 324 may identify the status of link 116. Specifically, field 322 may indicate whether link 116 appears to be UP or DOWN to the storage array 101B. Field 326 may identify the value of the locally-preferred configuration setting 103B (shown in FIG. 1). Although not shown, status message 320 may be timestamped, and it may also include the timestamp of the last valid status message 310 that is received at storage array 101B.

Message 330 is an example of a status message that is transmitted by the witness node 109 to storage arrays 101A and 101B. As illustrated, status message 330 may include fields 332, 334, 336, and 338. Field 332 may identify the status of link 114. Specifically, the field 332 may indicate whether link 114 appears to be UP or DOWN to the witness node 109. Field 334 may identify the status of link 116. Specifically, field 334 may indicate whether link 116 appears UP or DOWN to the witness node 109. Field 336 may identify a value of locally-preferred configuration setting 103A that has been reported to the witness node 109 by storage array 101A. The value of field 336 may be equal to the value of field 316 in a status message 310 that is received by the witness node 109 from the storage array 101A. The value of field 338 may be equal to the value of field 326 in a status message 320 that is received by the witness node 109 from the storage array 101B. Field 338 may identify a value of locally-preferred configuration setting 103B that has been reported to the witness node 109 by storage array 101B. In instances in which status message 330 is transmitted to storage array 101A, field 336 may be left blank. In instances in which status message 330 is transmitted to storage array 101B, field 338 may be left blank.

FIG. 4A illustrates an example of the contents of a state table 108A. FIG. 4A illustrates what contents might be present in state tables 108A and 108B when the storage system is in state 202 (i.e., when all of links 112, 114, and 116 are UP and the storage system 100 is operating correctly).

FIG. 4B illustrates an example of the contents of state table 108A, when link 116 is down. FIG. 4B illustrates that in response to the failure of link 116: (i) storage array 101A has set the value of locally-preferred configuration setting 103A to indicate that storage array 101A prefers storage array 101A to assume an active role in the event of a failure of link 112, and (ii) storage array 101B has set the value of locally-preferred configuration setting 103B to indicate that storage array 101B prefers storage array 101A to assume an active role in the event of a failure of link 112. In the example of FIG. 4B, state table 108A is in a steady state.

FIG. 4C illustrates an example of the contents of state table 108A when state table 108A is in an unsteady state. FIG. 4C illustrates that after link 116 has failed: (i) the value of locally-preferred configuration setting 103A is NONE, and (ii) storage array 101B has set the value of locally-preferred configuration setting 103B to indicate that storage array 101B prefers storage array 101A to assume an active role in the event of a failure of link 112.

State table 108A may be in a steady state when all items of information contained in the table (or at least two items of interest) are consistent with each other. For example, state table 108 may be in a steady state when it indicates that both storage array 101A and storage array 101B prefer the same storage array to assume an active role in the event of a failure of link 112. As another example, state table 108 may be in a steady state when table 108 indicates that the storage array 101B and the witness node 109B have reported the same status for link 116. As yet another example, state table 108A may be in a steady state when table 108 indicates that storage array 101A and the witness node 109 have reported the same status for link 114.

State table 108 may be in an unsteady state when at least two items of information contained in the table are not consistent with each other. For example, state table 108 may be in an unsteady state when it indicates that storage array 101A and storage array 101B prefer different storage arrays to assume an active role in the event of a failure of link 112 (i.e., when it indicates that the values of locally-preferred configuration settings 103A-B are not in agreement with each other). As another example, state table 108 may be in an unsteady state when table 108 indicates that the storage array 101B and the witness node 109 have reported conflicting status information for link 116 (e.g., one has reported that the link is UP and the other has reported that the link is DOWN). As yet another example, state table 108 may be in an unsteady state when state table 108 indicates that storage array 101A and the witness node 109 have reported conflicting status information for link 114 (e.g., one has reported that the link is UP and the other has reported that the link is DOWN).

State table 108B may have similar structure to state table 108A. In some implementations, state table 108A may include the values of fields 312, 314, 316 that were found in the most recent status message 310 that is transmitted by storage array 101A. State table 108A may also include the values of fields 322, 324, and 326 that were found in the most recent status message 320 that is received by storage array 101A. State table 108A may also include the values of fields 332, 334, and 336 that were found in the most recent status message 330 that is received by storage array 101A. In some implementations, state table 108B may include the values of fields 322, 324, 326 that were found in the most recent status message 320 that is transmitted by storage array 101B. State table 108B may also include the values of fields 312, 314, and 316 that were found in the most recent status message 310 that is received by storage array 101B. State table 108B may also include the values of fields 332, 334, and 336 that were found in the most recent status message 330 that is received by storage array 101B.

In some implementations, each of storage arrays 101A-B may update its respective state table 108 with the contents of received status messages, as they arrive. In some implementations, only valid status messages may be used to update any of state tables 108A and 108B. A status message may be valid only when its timestamp is greater than the timestamp of the most recently received message (of the same type) or when it is received within a predetermined time period. Each of state tables 108A and 108B may be implemented as a single data structure or as a plurality of independent data structures.

Figure 5:
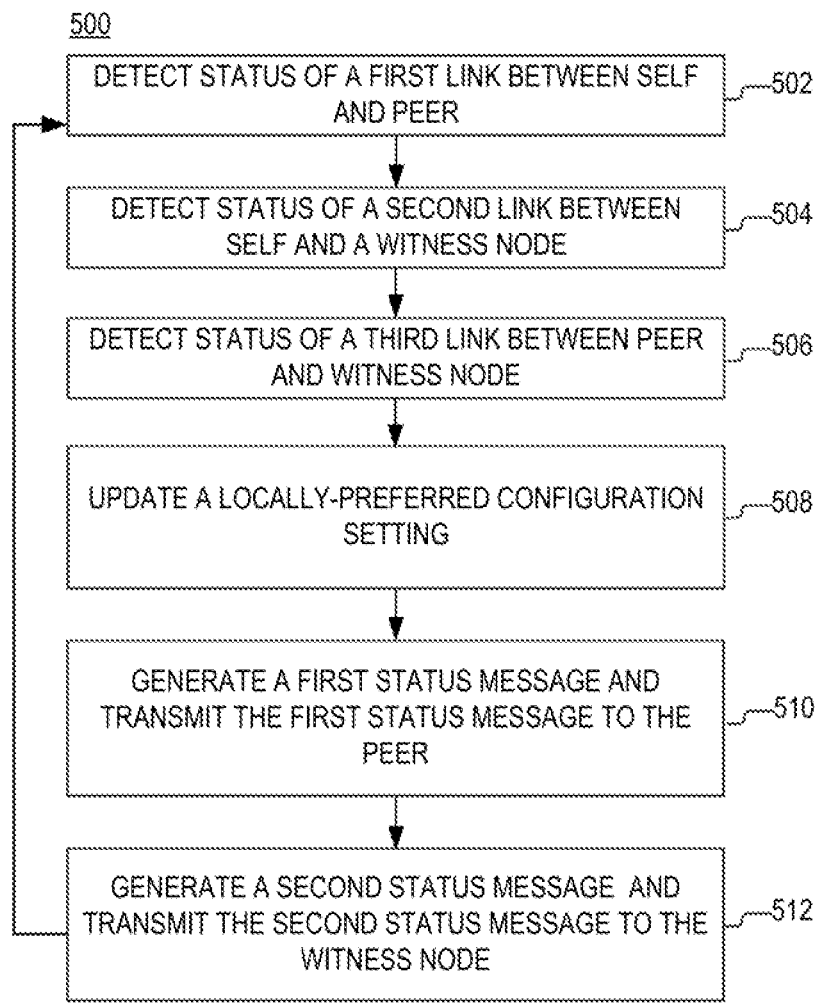
FIG. 5 is a flowchart of an example of a process, according to aspects of the disclosure.

FIG. 5 is a flowchart of an example of a process 500, according to aspects of the disclosure. The process 500 may be performed by either one of the storage arrays 101A-B. Under the nomenclature of FIG. 5, the storage array executing the process is "self" and the other storage array is a "peer". Although in the present example the process 500 is described as being executed by the storage array 101A, it will be understood that the process 500 may also be executed by storage array 101B. For example, and without limitation, the process 500 may be executed by each (or at least one) of storage arrays 101A-B when the storage system 100 is in any of states 202, 206, and 210. Alternatively, in some implementations, the process 500 may be executed during the operation of the storage system 100, irrespective of the state of the storage system 100. Stated succinctly, the process 500 is not limited to being executing at any particular time of the operation of the storage system 100.

At step 502, the storage array 101A detects the status of link 112. Specifically, the storage array 101A detects whether link 112 is UP or DOWN. At step 504, the storage array 101A detects the status of link 114. Specifically, the storage array 101A detects whether link 114 is UP or DOWN. At step 506, the storage array 101A detects the status of link 116. Specifically, the storage array detects whether link 116 is UP or DOWN based on at least one of: (i) a status message 330 that is received by the storage array 101A from the witness node 109 and/or (ii) a status message 320 that is received by the storage array 101A from the storage array 101B.

At step 508, the storage array 101A optionally updates the value of locally-preferred configuration setting 103A. When both links 114 and 115 are determined to be UP (at steps 504 and 506), the storage array 101A may leave the value of locally-preferred configuration setting 103A unchanged. For example, storage array 101A may allow the value of locally-preferred configuration setting 103A to remain NONE. When both links 114 and 115 are determined to be DOWN (at steps 504 and 506), the storage array 101A may leave the value of locally-preferred configuration setting 103A unchanged. For example, storage array 101A may allow the value of locally-preferred configuration setting 103A to remain NONE. When link 114 is determined to be UP and link 116 is determined to be DOWN (at steps 504 and 506), the storage array 101A may set the value of locally-preferred configuration setting 103A to indicate that storage array 101A prefers storage array 101A to assume an active role in the event of a failure of link 112. For example, storage array 101A may set the value of locally-preferred configuration setting 103A to ARRAY_A. When link 114 is determined to be DOWN and link 116 is determined to be UP (at steps 504 and 506), the storage array 101A may set the value of locally-preferred configuration setting 103A to indicate that storage array 101A prefers storage array 101B to assume an active role in the event of a failure of link 112. For example, storage array 101A may set the value of locally-preferred configuration setting 103A to ARRAY_B.

At step 510, the storage array 101A generates a status message 310, based on the information determined at steps 502-508, and transmits the generated status message to storage array 101B. At step 512, the storage array 101A generates a status message 310, based on the information determined at steps 502-508, and transmits the generated status message to the witness node 109. Although in the present example the storage array 101A transmits different status messages to storage array 101B and the witness node 109, alternative implementations are possible in which the same status message is transmitted.

In some implementations, when the process 500 is performed by storage array 101B, storage array 101B may generate status messages 320 (instead of status messages 310), at steps 510-512. In some implementations, when the process 500 is performed by storage array 101B, storage array 101B may detect the status of link 114 (at step 506) based on at least one of: (i) a status message 330 that is received by the storage array 101B from the witness node 109 and/or (ii) a status message 310 that is received by the storage array 101B from the storage array 101A. In some implementations, when the process 500 is performed by storage array 101B, storage array 101B may detect the status of link 116 (at step 504) in a well-known fashion (e.g., by sending a ping to the witness node 109A or determining whether it has received an acknowledgment for the most recent communication that is sent to the witness node 109.) In some implementations, when the process 500 is performed by storage array 101B, the storage array may optionally update the value of locally-preferred configuration setting 103B by using the same rules. For example, if both links 114 and 116 are UP or if both of them are DOWN, the storage array 101B may leave the value of locally-preferred configuration setting 103B unchanged. On the other hand, if the link between one of the storage arrays 101A-B and the witness node 109 goes DOWN, while the other remains UP, the storage array 101B may set the value of locally-preferred configuration setting 103B to indicate that the storage array 101B prefers the other storage array (e.g., the storage array whose link to the witness node 109 remains UP) to assume an active role in the event of a failure of link 112.

Figure 6:
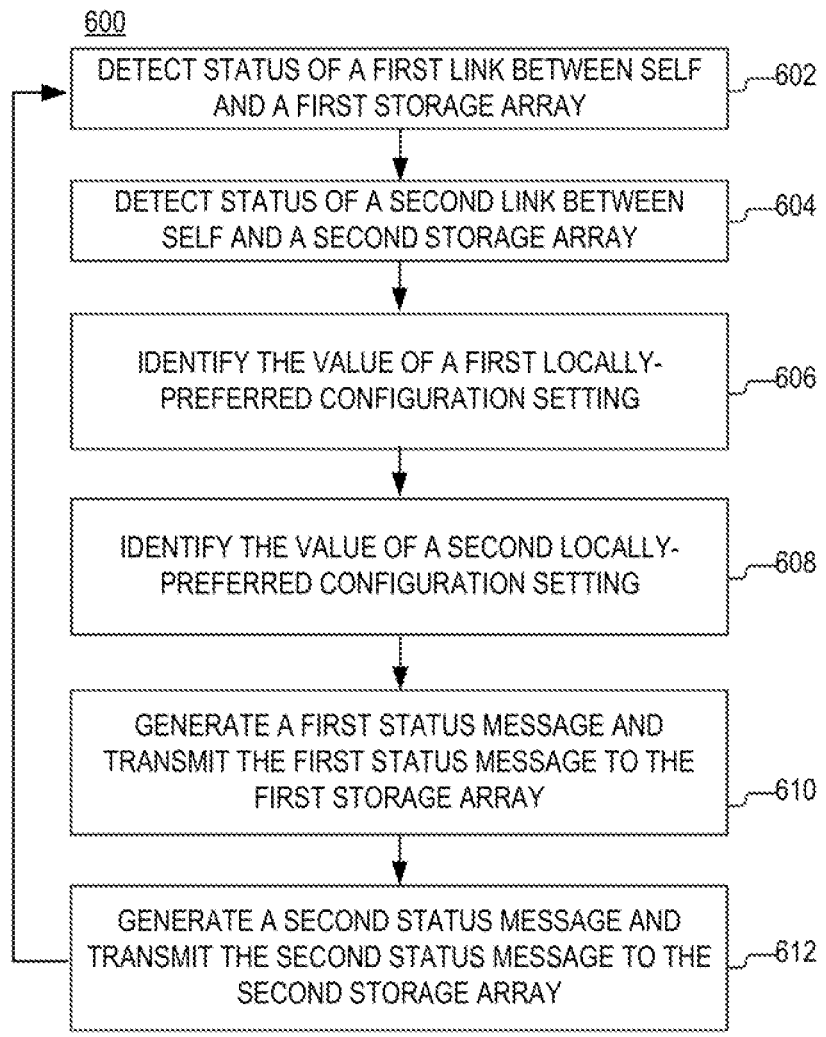
FIG. 6 is a flowchart of an example of a process, according to aspects of the disclosure.

FIG. 6 is a flowchart of an example of a process 600, according to aspects of the disclosure. At step 602, the witness node 109 detects the status of link 114. Specifically, the witness node 109 detects whether link 114 is UP or DOWN. At step 604, the witness node 109 detects the status of link 116. Specifically, the witness node 109 detects whether link 116 is UP or DOWN. At step 606, the witness node 109 detects the value of locally-preferred configuration setting 103A. Specifically, the witness node 109 may retrieve the value of locally-preferred configuration setting 103A from a status message 310 that is received at the witness node 109 from storage array 101A. At step 608, the witness node 109 detects the value of locally-preferred configuration setting 103B. Specifically, the witness node 109 may retrieve the value of locally-preferred configuration setting 103B from a status message 320 that is received at the witness node 109 from storage array 101B. At step 610, the witness node 109 generates a status message 330 based on some (or all) of the information determined at steps 602-608 and transmits the status message to the storage array 101A. At step 612, the witness node 109 generates another status message 330 based on some (or all) of the information determined at steps 602-608 and transmits the status message to the storage array 101B. Although in the present example the witness node 109 transmits different status messages to storage arrays 101A-B, alternative implementations are possible in which the same status message is transmitted.

In some implementations, the witness node 109 may execute the process 600 in a loop (as shown in FIG. 6). In such implementations, when the witness node 109 is first started, it might start sending out status messages 330 right away, without waiting for the status of links 112, 114, and/or 116 to be determined, and/or without waiting for the receipt of status messages 310 and 320 from storage arrays 101A and 101B, respectively. In such implementations, until the statuses of links 112, 114, and 166 are determined, the witness node 109 may report the links 112, 114, and 116 as being DOWN, by default. Similarly, until status messages 310 and 320 are received by the witness node 109, which identify the values locally-preferred configuration settings 103A and 103B, the witness node 109 may report their values of locally-preferred configuration settings 103A and 103B as being NONE.

Figure 7:
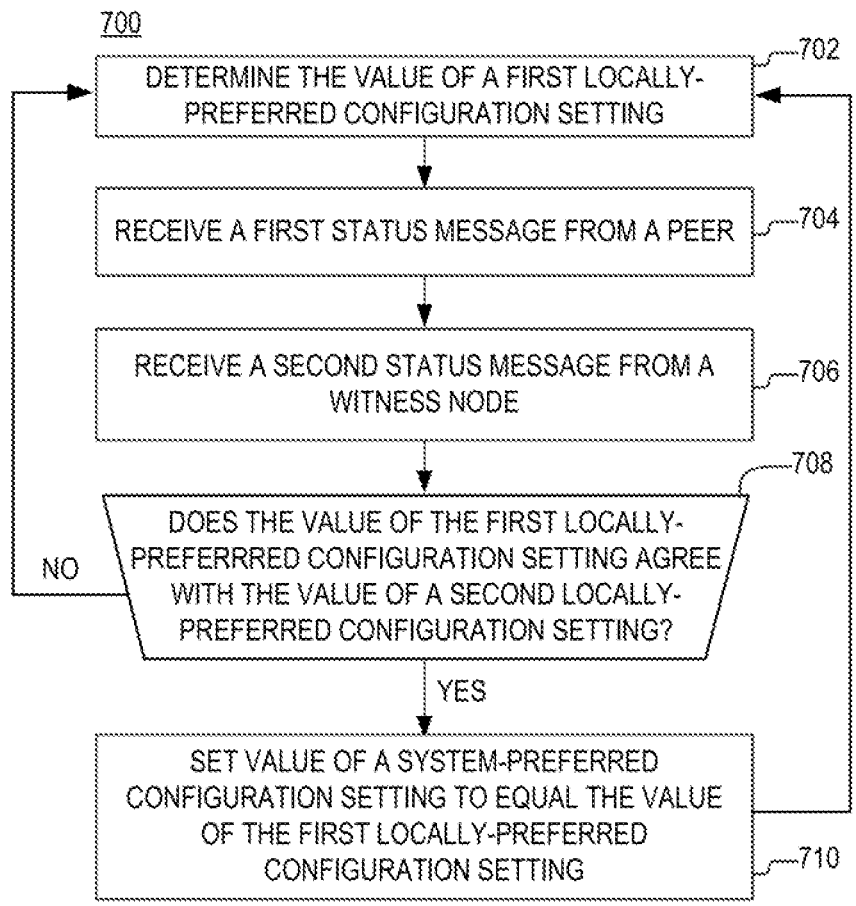
FIG. 7 is a flowchart of an example of a process, according to aspects of the disclosure.

FIG. 7 is a flowchart of an example of a process 700, according to aspects of the disclosure. The process 700 may be performed by either one of the storage arrays 101A-B. Under the nomenclature of FIG. 7, the storage array executing the process is "self" and the other storage array is a "peer". Although in the present example the process 700 is described as being executed by the storage array 101A, it will be understood that the process 700 may also be executed by storage array 101B. For example, and without limitation, the process 700 may be executed by each (or at least one) of storage arrays 101A-B when the storage system 100 is in state 204 (shown in FIG. 2). In other words, the process 700 may be executed in response to the storage array 101A detecting that one of links 114 and 116 has failed. Alternatively, in some implementations, the process 700 may be executed during the operation of the storage system 100, irrespective of the state of the storage system 100. In such implementations, the process 700 may be executed concurrently with the process 500 (shown in FIG. 5). Stated succinctly, the process 700 is not limited to being executing at any particular time of the operation of the storage system 100.

At step 702, the storage array 101A determines the current value of the locally-preferred configuration setting 103A. As noted above, the value of the locally-preferred configuration setting 103A may be set as a result of executing the process 500, which is discussed above with respect to FIG. 5. At step 704, the storage array 101A receives a status message 320 from the storage array 101B. At step 706, the storage array 101B receives a status message 330 from the witness node 109. At step 708, the storage array 101A detects if the value of the locally-preferred configuration setting 103A (which is stored in the memory of storage array 101A) matches the value of the locally-preferred configuration setting 103B (which is stored in the memory of storage array 101B). In one example, the storage array 101A detects if the value of the locally-preferred configuration setting 103A matches both (or at least one) of: (i) the value of the locally-preferred configuration setting 103B that is reported in the status message 320 (received at step 704) and/or (ii) the value of the locally-preferred configuration setting 103B that is reported in the status message 330. If the value of the locally-preferred configuration setting 103A matches the value of the locally-preferred configuration setting 103B, the process 700 proceeds to step 710. If the value of locally-preferred configuration setting 103A does not match the value of locally-preferred configuration setting 103B, the process 700 returns to step 708. The values of locally-preferred configuration settings 103A-B match when they both indicate that the same storage array is desired by both of storage arrays 101A-B to assume an active role when link 112 fails.

At step 710, storage array 101A sets the system-preferred configuration setting 104A to the value of locally-preferred configuration setting 103A. For example, if the value of locally-preferred configuration setting 103A indicates that the storage array 101A prefers the storage array 101A to assume an active role in the event of a failure of link 112 (i.e., if the value is "ARRAY_A"), the storage array 101A may also set the value the system-preferred configuration setting 104A to indicate that the storage array 101A is the system-preferred storage array. Alternatively, if the value of locally-preferred configuration setting 103A indicates that the storage array 101A prefers the storage array 101B to assume an active role in the event of a failure of link 112 (i.e., if the value is "ARRAY_B"), the storage array 101A may set the value the system-preferred configuration setting 104A to indicate that the storage array 101B is the system-preferred storage array.

Figure 8:
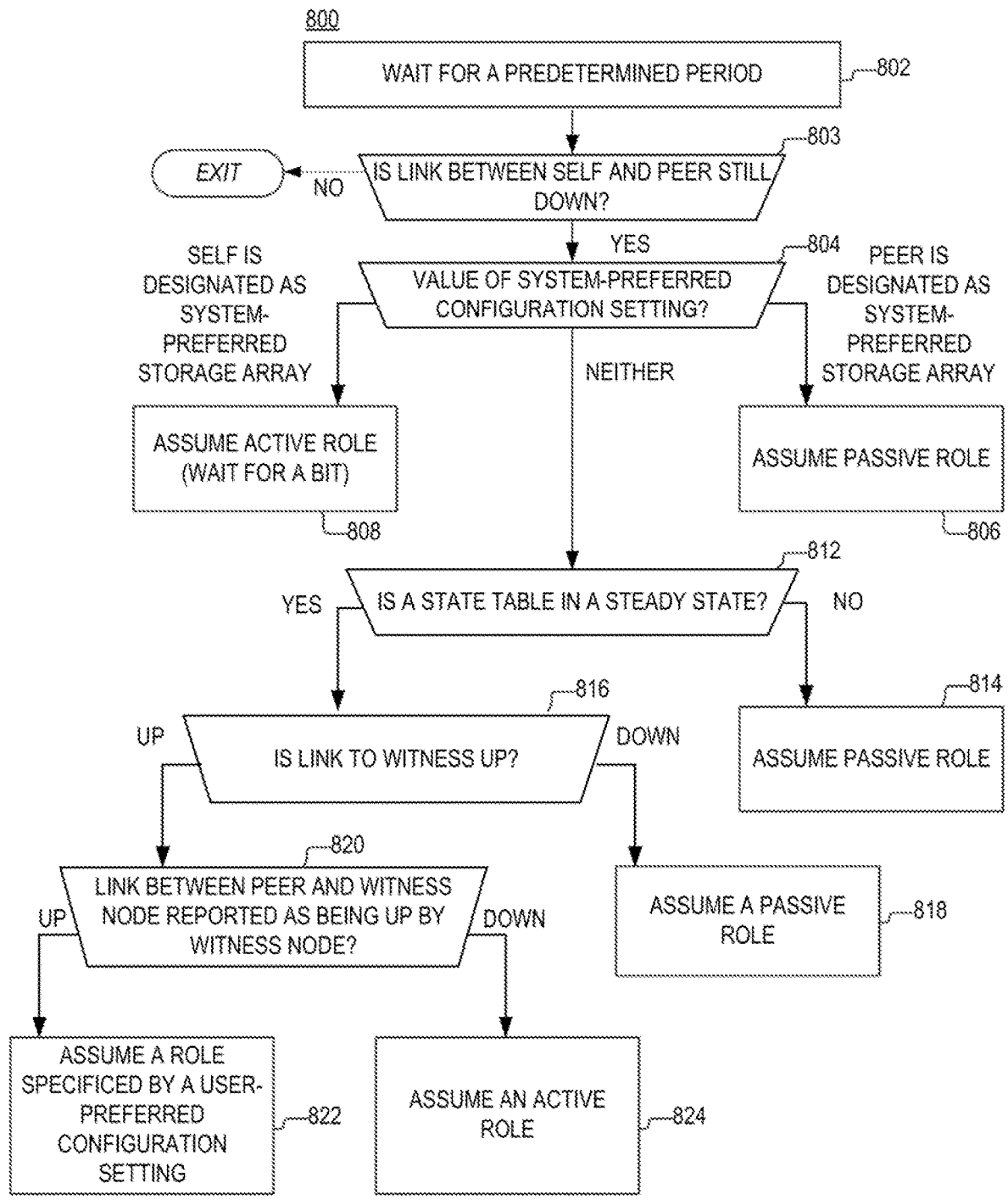
FIG. 8 is a flowchart of an example of a process, according to aspects of the disclosure.

As noted above, in some implementations, the process 700 may be executed by the storage array 101B. When the process 700 is performed by storage array 101B, storage array 101B may determine the value of locally-preferred configuration setting 103B (at step 702) and receive a status message 310 from storage array 101A (at step 704). Furthermore, at step 708, the storage array 101B may detect if the value of the locally-preferred configuration setting 103B is the same as both (or at least one) of: (i) the value of the locally-preferred configuration setting 103A that is reported in the status message 310 (received at step 704) and/or (ii) the value of the locally-preferred configuration setting 103A that is reported in a status message 330. In addition, at step 710, the storage array 101B may set the system-preferred configuration setting 104B to the value of locally-preferred configuration setting 103B FIG. 8 is a flowchart of an example of a process 800, according to aspects of the disclosure. The process 800 may be performed by either one of the storage arrays 101A-B. Under the nomenclature of FIG. 8, the storage array executing the process is "self" and the other storage array is a "peer". Although in the present example the process 800 is described as being executed by the storage array 101A, it will be understood that the process 800 may also be executed by storage array 101B. For example, and without limitation, the process 800 may be executed by each (or at least one) of storage arrays 101A-B when the storage system 100 is in state 208 (shown in FIG. 2). In other words, the process 800 may be executed in response to the storage array 101A detecting that link 112 is DOWN.

At step 802, the storage array 101A waits for a predetermined period after detecting that link 112 is DOWN. At step 803, the storage array 101A detects if link 112 remains DOWN after the predetermined period has passed. If link 112 is still DOWN, the process 800 proceeds to step 804. Otherwise, if link 112 appears to be back up, the process 800 ends.

At step 804, the storage array 101A detects the value of the system-preferred configuration setting 104A. If the value indicates that the storage array 101B is designated to assume an active role in the event of a failure of link 112, the process 800 proceeds to step 806. If the value of the system-preferred configuration setting 104A indicates that the storage array 101A is designated to assume an active role in the event of a failure of link 112, the process 800 proceeds to step 808. If the value of the system-preferred configuration setting indicates that neither storage array 101A nor storage array 101B is designated to assume an active role in the event of a failure of link 112, the process 800 proceeds to step 812.

At step 806, storage array 101A assumes a passive role. At step 808, storage array 101A assumes an active role. At step 812, the storage array 101A detects if the state table 108A is in a steady state. As noted above, the state table 108A may be in an unsteady state when link 112 appears to be down to the storage array 101A, but is reported to be UP by the storage array 101B. If the state table 108A is in a steady state, the process 800 proceeds to step 816. Otherwise, if table 108A is not in a steady state, the process 800 proceeds to step 814.

At step 814, the storage array 101A assumes a passive role. At step 816, the storage array 101A detects whether link 114 between storage array 101A and the witness node 109 is UP. If link 114 is UP, the process 800 proceeds to step 820. Otherwise, if link 114 is DOWN, the process 800 proceeds to step 818.

At step 818, the storage array 101A assumes a passive role. At step 820, the storage array 101A detects whether link 116 between the witness node 109 and the storage array 101B is UP. As noted above, the storage array 101A may determine whether link 116 is UP based on information that is reported by the witness node 109 in one or more status messages 330 that are received at storage array 101A from the witness node 109. If the link is UP, the process 800 proceeds to step 822. Otherwise, if the link is DOWN, the process 800 proceeds to step 824. At step 822, the storage array 101A assumes a role that is specified by the user-preferred configuration setting 106A. For instance, if the user-preferred configuration setting 106A is set to a first value (e.g., "ARRAY_A"), the storage array may assume an active role. On the other hand, if the user-preferred configuration setting 106B is set to a second value (e.g., "ARRAY_B"), the storage array 101A assumes a passive role. At step 824, the storage array assumes an active role.

As noted above, in some implementations, the process 800 may be executed by the storage array 101B. When the process 800 is performed by storage array 101B, storage array 101B may determine the value of the system-preferred configuration setting 104B and use it as a basis for executing step 804. Furthermore, the storage array 101B may detect whether state table 108B is in a steady state (at step 812). In addition, at step 816, the storage array 101B may detect whether link 116 is UP, and, at step 820, the storage array 110B may detect whether link 114 is UP. The storage array 101B may detect the value of the user-preferred configuration setting 106B (at step 822) and use it as a basis for executing step 822.

Referring to FIG. 9, a computing device 900 may include processor 902, volatile memory 904 (e.g., RAM), non-volatile memory 906 (e.g., a hard disk drive, a solid-state drive such as a flash drive, a hybrid magnetic and solid-state drive, etc.), graphical user interface (GUI) 908 (e.g., a touchscreen, a display, and so forth) and input/output (I/O) device 920 (e.g., a mouse, a keyboard, etc.). Non-volatile memory 906 stores computer instructions 912, an operating system 916 and data 918 such that, for example, the computer instructions 912 are executed by the processor 902 out of volatile memory 904. Program code may be applied to data entered using an input device of GUI 908 or received from I/O device 920.

Processor 902 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard-coded into the electronic circuit or soft coded by way of instructions held in a memory device. A "processor" may perform the function, operation, or sequence of operations using digital values or using analog signals. In some embodiments, the "processor" can be embodied in an application-specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

FIGS. 1-9 are provided as an example only. At least some of the steps discussed with respect to FIGS. 1-9 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a first storage array, comprising:
    detecting whether a second storage array has designated the first storage array as a locally-preferred storage array, the detecting being performed when a first link between the second storage array and a witness node is down;
    setting a value of a first configuration setting to indicate that the first storage array is designated as a system-preferred storage array, the value of the first configuration setting being stored in a memory of the first storage array, the value of the first configuration setting being set only when the second storage array has designated the first storage array as a locally-preferred storage array;
    detecting, by the first storage array, whether a second link between the first storage array and the second storage array is down; and
    when the second link is down, assuming one of an active role or a passive role based, at least in part, on the value of the first configuration setting.

2. The method of claim 1, wherein assuming one of an active role or a passive role based, at least in part, on the value of the first configuration setting includes:
    assuming, by the first storage array, an active role, when the first configuration setting indicates that the first storage array is designated as a system-preferred storage array,
    assuming, by the first storage array, a passive role, when the first configuration setting indicates that the second storage array is designated as a system-preferred storage array, and
    assuming, by the first storage array, a role that is, at least in part, specified by a second configuration setting, when the first configuration setting indicates that neither the first storage array nor the second storage array is designated as a system-preferred storage array.

3. The method of claim 1, wherein detecting whether the second storage array has designated the first storage array as the locally-preferred storage array includes:
    receiving a first status message from the second storage array, the first status message indicating whether the second storage array has designated the first storage array as a locally-preferred storage array;
    receiving a second status message from the witness node, the second status message indicating whether the second storage array has designated the first storage array as a locally-preferred storage array;
    detecting whether the first status message and the second status message agree.

4. The method of claim 1, wherein the value of the first configuration setting is left unchanged when the second storage array has not designated the first storage array as a locally-preferred storage array.

5. The method of claim 1, wherein detecting whether the second storage array has designated the first storage array as the locally-preferred storage array includes receiving a status message that is transmitted from the second storage array to the first storage array, and processing the status message to determine whether the second storage array has designated the first storage array as the locally-preferred storage array.

6. The method of claim 1, wherein detecting whether the second storage array has designated the first storage array as the locally-preferred storage array includes receiving a status message that is transmitted from the witness node to the first storage array, and processing the status message to determine whether the second storage array has reported to the witness node that the second storage array has designated the first storage array as the locally-preferred storage array.

7. The method of claim 1, wherein assuming the active role includes continuing to serve incoming IO requests, and assuming a passive role includes stopping to serve incoming IO requests.

8. A storage array, comprising:
a memory configured to store a first configuration setting and a second configuration setting; and
at least one processor operatively coupled to the memory, the at least one processor being configured to perform the operations of:
detecting whether a peer storage array has designated the storage array as a locally-preferred storage array, the detecting being performed when a first link between the peer storage array and a witness node is down;
setting a value of the first configuration setting to indicate that the storage array is designated as a system-preferred storage array, the value of the first configuration setting being stored in a memory of the storage array, the value of the first configuration setting being set only when the peer storage array has designated the storage array as a locally-preferred storage array;
detecting, by the storage array, whether a second link between the storage array and the peer storage array is down; and
when the second link is down, assuming one of an active role or a passive role based, at least in part, on the value of the first configuration setting.

9. The storage array of claim 8, wherein assuming one of an active role or a passive role based, at least in part, on the value of the first configuration setting includes:
assuming, by the storage array, an active role, when the first configuration setting indicates that the storage array is designated as a system-preferred storage array,
assuming, by the storage array, a passive role, when the first configuration setting indicates that the peer storage array is designated as a system-preferred storage array, and
assuming, by the storage array, a role that is, at least in part, specified by the second configuration setting, when the first configuration setting indicates that neither the storage array nor the peer storage array is designated as a system-preferred storage array.

10. The storage array of claim 8, wherein detecting whether the peer storage array has designated the storage array as the locally-preferred storage array includes:
receiving a first status message from the peer storage array, the first status message indicating whether the peer storage array has designated the storage array as a locally-preferred storage array;
receiving a second status message from the witness node, the second status message indicating whether the peer storage array has designated the storage array as a locally-preferred storage array;
detecting whether the first status message and the second status message agree.

11. The storage array of claim 8, wherein the value of the first configuration setting is left unchanged when the peer storage array has not designated the storage array as a locally-preferred storage array.

12. The storage array of claim 8, wherein detecting whether the peer storage array has designated the storage array as the locally-preferred storage array includes receiving a status message that is transmitted from the peer storage array to the storage array, and processing the status message to determine whether the peer storage array has designated the storage array as the locally-preferred storage array.

13. The storage array of claim 8, wherein detecting whether the peer storage array has designated the storage array as the locally-preferred storage array includes receiving a status message that is transmitted from the witness node to the storage array, and processing the status message to determine whether the peer storage array has reported to the witness node that the peer storage array has designated the storage array as the locally-preferred storage array.

14. The storage array of claim 8, wherein assuming the active role includes continuing to serve incoming IO requests, and assuming a passive role includes stopping to serve incoming IO requests.

15. A non-transitory computer-readable medium storing one or more processor-executable instructions, which, when executed by at least one processor of a first storage array, cause the at least one processor to perform the operations of:
detecting whether a second storage array has designated the first storage array as a locally-preferred storage array, the detecting being performed when a first link between the second storage array and a witness node is down;
setting a value of a first configuration setting to indicate that the first storage array is designated as a system-preferred storage array, the value of the first configuration setting being stored in a memory of the first storage array, the value of the first configuration setting being set only when the second storage array has designated the first storage array as a locally-preferred storage array;
detecting, by the first storage array, whether a second link between the first storage array and the second storage array is down; and
when the second link is down, assuming one of an active role or a passive role based, at least in part, on the value of the first configuration setting.

16. The non-transitory computer-readable medium of claim 15, wherein assuming one of an active role or a passive role based, at least in part, on the value of the first configuration setting includes:
assuming, by the first storage array, an active role, when the first configuration setting indicates that the first storage array is designated as a system-preferred storage array,
assuming, by the first storage array, a passive role, when the first configuration setting indicates that the second storage array is designated as a system-preferred storage array, and
assuming, by the first storage array, a role that is, at least in part, specified by a second configuration setting, when the first configuration setting indicates that neither the first storage array nor the second storage array is designated as a system-preferred storage array.

17. The non-transitory computer-readable medium of claim 15, wherein detecting whether the second storage array has designated the first storage array as the locally-preferred storage array includes:
receiving a first status message from the second storage array, the first status message indicating whether the second storage array has designated the first storage array as a locally-preferred storage array;
receiving a second status message from the witness node, the second status message indicating whether the second storage array has designated the first storage array as a locally-preferred storage array;

detecting whether the first status message and the second status message agree.

18. The non-transitory computer-readable medium of claim 15, wherein the value of the first configuration setting is left unchanged when the second storage array has not designated the first storage array as a locally-preferred storage array.

19. The non-transitory computer-readable medium of claim 15, wherein detecting whether the second storage array has designated the first storage array as the locally-preferred storage array includes receiving a status message that is transmitted from the second storage array to the first storage array, and processing the status message to determine whether the second storage array has designated the first storage array as the locally-preferred storage array.

20. The non-transitory computer-readable medium of claim 15, wherein detecting whether the second storage array has designated the first storage array as the locally-preferred storage array includes receiving a status message that is transmitted from the witness node to the first storage array, and processing the status message to determine whether the second storage array has reported to the witness node that the second storage array has designated the first storage array as the locally-preferred storage array.

* * * * *